United States Patent [15] 3,681,382
Gschwend [45] Aug. 1, 1972

[54] 3-AMINOINDAZOLES

[72] Inventor: Heinz Werner Gschwend, Millburn, N.J.

[73] Assignee: Ciba-Geigy Corporation, Ardsley, N.Y.

[22] Filed: Feb. 7, 1969

[21] Appl. No.: 797,702

[52] U.S. Cl. ...... 260/310 C, 260/247.5 B, 260/295 B,
260/268 BC, 260/296 B, 260/293.7,
424/273, 424/267, 424/250, 424/248,
424/263
[51] Int. Cl. ............................................ C07d 49/02
[58] Field of Search ........................... 260/310 C,
295 F, 296 B, 293 D, 260/268 BC, 247.5 B

[56] References Cited

UNITED STATES PATENTS 3,133,081  5/1964  Lafferty et al ............. 260/310 C 3,301,482  3/1970  Levon et al. .............. 260/310 C Primary Examiner—Henry R. Jiles
Assistant Examiner—Robert T. Bond
Attorney—Harry Goldsmith, Bryant W. Brennan, Joseph G. Kolodny and Edward J. Sites

[57] ABSTRACT

New 1-aryl-3-aminoindazoles, e.g., those of the formula

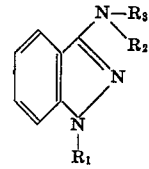

$R_1$ = Aromatic radical
$R_2$ = H, alkyl, free, esterified or etherified hydroxyalkyl
$R_3$ = Aza-(alkyl, cycloalkyl-alkyl, aralkyl, alkanoyl, cycloalkyl-alkanoyl or aralkanoyl)
$R_2 + R_3$ = Aza-(alkylene, free, esterified or etherified hydroxy-alkylene or aralkylene)

and salts thereof are antidepressants.

4 Claims, No Drawings

3-AMINOINDAZOLES

SUMMARY OF THE INVENTION

The present invention concerns and has for its object the provision of new 1-aryl-3-aminoindazoles, more particularly of those of Formula I

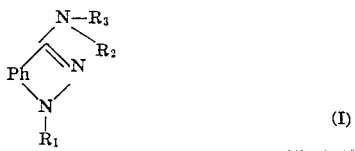

(I)

in which Ph is a 1,2-phenylene radical, $R_1$ is an aromatic radical, $R_2$ is hydrogen, lower alkyl or free, esterified or etherified hydroxyalkyl, $R_3$ is an aza-(lower alkyl, cycloalkyl-alkyl, aralkyl, alkanoyl, cycloalkyl-alkanoyl or aralkanoyl) group or $R_2$ and $R_3$, when taken together, represent aza-(alkylene, free, esterified or etherified hydroxyalkylene or aralkylene), in which

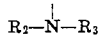

the heteroatoms are separated by at least two carbon atoms, of acyl derivatives, quaternaries and salts thereof, as well as of corresponding pharmaceutical compositions and of methods for the preparation and application of these products. Said compositions are useful antidepressants and antiinflammatory agents.

DESCRIPTION OF THE PREFERRED EMBODIMENTS

The 1,2-phenylene radical Ph and the iso- or heterocyclic aryl radical $R_1$ are unsubstituted or substituted by one or more than one, preferably by 1 or 2, of the same or of different substituents, for example, by lower alkyl, such as methyl, ethyl, n-or i-propyl or -butyl, free, etherified or esterified hydroxy or mercapto groups, such as lower alkoxy or alkylmercapto, e.g., methoxy, ethoxy, n- or i-propoxy or -butoxy, halogeno, e.g., fluoro, chloro or bromo, trifluoromethyl, nitro or amino, especially di-lower alkylamino, e.g., dimethylamino or diethylamino. Preferred 1,2-phenylene radicals Ph are 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene or (di-lower alkylamino)-1,2-phenylene, and the aromatic radical $R_1$ is preferably monocyclic and represents, for example, H—Ph, especially phenyl, (lower alkyl)-phenyl, (lower alkoxy)-phenyl, (lower alkylmercapto)-phenyl, (halogeno)-phenyl, (trifluoromethyl)-phenyl, (nitro)-phenyl or (di-lower alkylamino)-phenyl, as well as pyridyl or (lower alkyl)-pyridyl. The term "lower" referred to above and hereinafter in connection with organic radicals or compounds respectively, defines such with up to seven, preferably up to four, carbon atoms.

A lower alkyl group $R_2$ is, for example, such mentioned above, but also n- or i-pentyl, n-hexyl or n-heptyl. A lower hydroxyalkyl radical $R_2$ is any of the above-mentioned alkyl radicals containing in any position of the chain, which is separated from the adjacent nitrogen atom by at least two carbon atoms, one hydroxy group. The latter may be esterified, e.g., by a lower alkanoic acid, e.g., acetic, propionic, butyric or pivalic acid, or etherified, e.g., by an alcohol, such as a lower alkanol.

An aza-(lower alkyl, cycloalkyl-alkyl or aralkyl) radical $R_3$ is, for example, amino-lower alkyl, mono- or di-lower alkylamino-lower alkyl, lower alkyleneimino-lower alkyl, monoaza-lower alkyleneimino-lower alkyl, 3 to 7 ring-membered cycloalkylamino-lower alkyl, cycloalkyl-lower alkylamino-lower alkyl, N-cycloalkyl-N-lower alkylamino-lower alkyl or N-cycloalkyl-lower alkyl-N-lower alkylamino-lower alkyl, HPh-lower alkylamino-lower alkyl or N-lower alkyl-N-, HPh-lower alkylamino-lower alkyl, e.g., ω(amino, methylamino, ethylamino, n- or i-propylamino or n-butylamino; dimethylamino, N-methyl-N-ethylamino, diethylamino, di-n-propylamino, di-isopropylamino or di-n-butylamino, ethyleneimino, pyrrolidino, 2-methylpyrrolidino, piperidino, 2- or 4-methyl-piperidino, 1,6- or 2,5-hexamethyleneimino, 1,7- or 2,6-heptamethyleneimino, piperazino, 4-methyl or ethyl-piperazino, cyclopropylamino, cyclopentylamino, cyclohexylamino, cyclopropylmethylamino, 2-cyclopentylethylamino, N-cyclopentyl-N-methylamino, N-cyclohexyl-N-methylamino, N-cyclohexyl-N-ethylamino, N-cyclopentylmethyl-N-ethylamino, benzylamino, 1- or 2-phenethylamino, N-methyl-N-benzylamino or N-ethyl-N-benzylamino)-ethyl, -propyl, -butyl or -pentyl. The aza-(lower alkanoyl, cycloalkylalkanoyl or aralkanoyl) radicals $R_3$ are, for example, the above-substituted alkyl radicals, in which the carbon atom, attached to the 3-amino nitrogen atom, is substituted by an oxo group.

$R_2$ and $R_3$, when taken together, preferably represent monoaza-lower alkylene or N-(hydroxy-lower alkyl, lower alkanoyloxy-lower alkyl, lower alkoxy-lower alkyl, HPh-lower alkyl or HPh)-monoaza-lower alkylene, e.g., 3-aza-1,5-pentylene, 3-aza-1,5or 1,6-hexylene, 4-aza-1,7or 2,6-heptylene or 3-(methyl, ethyl, n-propyl, 2-hydroxyethyl, 3-hydroxypropyl, 2-acetoxyethyl, 2-methoxyethyl, 4-methoxybutyl, benzyl, 2-phenethyl, phenyl or 4-tolyl)-1,5-pentylene. In the above amino groups two hetero atoms are separated by at least two carbon atoms.

Acyl derivatives of the compounds of Formula I in which $R_2$ is hydrogen and $R_3$ is aza-(alkyl, cycloalkylalkyl or aralkyl), are preferably those derived from lower alkanoic or HPh-lower alkanoic acids, such as the acetyl, propionyl, butyryl, pivalyl, benzoyl or phenylacetyl derivatives. Quaternaries are preferably lower alkyl- or HPh-lower alkylammonium salts, such as halides, sulfates or sulfonates, e.g., methyl-, ethyl- or benzylammonium chlorides, bromides, iodides, methyl- or ethylsulfates, methane, ethane or p-toluene sulfonates.

The compounds of the invention exhibit valuable pharmacological properties. Apart from antiinflammatory activity, they exhibit primarily antidepressant effects, as can be demonstrated in animal tests, using advantageously mammals, e.g., mice or rats, as test objects. They can be applied enterally or parenterally, e.g., in the form of aqueous solutions or suspensions, in the dosage range between about 0.1 and 50 mg/kg/day, preferably between about 0.5 and 25 mg/kg/day, advantageously between about 1 and 10 mg/kg/day. The antiinflammatory effects can be determined, for example, in the rat paw edema test system [Winter et al., Proc. Soc. Exp. Biol. & Med. III, 544 (1962)] and the anti-depressant effects, for example, in the amphetamine potentiation test system (P. Carlton, Psychopharmacologia 1961, Vol. II, 364). In the latter, about 8 month old male rats are trained to press a bar every 30 seconds, in order to avoid an electric shock applied through the floor grid. In case the animals receive intraperitoneally 0.25 mg/kg/day of amphetamine, their performing rate for avoiding said shocks during a period of about 2-½ hours is higher than that of placebo treated animals. In case said animals receive the compounds of the invention orally or intraperitoneally in the above dosages and about 45 minutes later the amphetamine, their rate of avoidance is highest, as compared with that of animals receiving (a) saline alone, (b) saline and amphetamine, or (c) saline and the compounds of the invention. Accordingly, the compounds of this invention are useful antidepressants, e.g., such of the imipramine-type, as well as useful intermediates in the manufacture of other valuable, e.g., pharmacologically active, products.

Particularly useful are the compounds of Formula I, in which Ph is 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene or (di-lower alkylamino)-1,2-phenylene, $R_1$ is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, pyridyl or (lower alkyl)-pyridyl, $R_2$ is hydrogen, lower alkyl, hydroxy-lower alkyl, lower alkanoyloxy-lower alkyl or lower alkoxy-lower alkyl, $R_3$ is (amino, mono- or di-lower alkylamino, lower alkyleneimino, monoaza-lower alkyleneimino, 3 to 7 ring-membered cycloalkylamino, cycloalkyl-lower alkylamino, N-cycloalkyl-N-lower alkylamino, N-cycloalkyl-lower alkyl-N-lower alkylamino, HPh-lower alkylamino or N-lower alkyl-N-HPh-lower alkylamino)-lower alkyl or -alkanoyl, or $R_2$ and $R_3$, when taken together, represent monoaza-lower alkylene or N-(hydroxy-lower alkyl, lower alkanoyloxy-lower alkyl, lower alkoxy-lower alkyl, HPh-lower alkyl or HPh)-monoaza-lower alkylene, in which

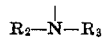

the hetero atoms are separated by at least two carbon atoms, the lower alkanoyl or HPh-lower alkanoyl derivatives of the compounds in which $R_2$ is hydrogen and $R_3$ is aza-(alkyl, cycloalkylalkyl or aralkyl)-lower alkyl, lower alkyl or HPh-alkyl quaternaries or acid addition salts thereof.

Preferred are the compounds of Formula II

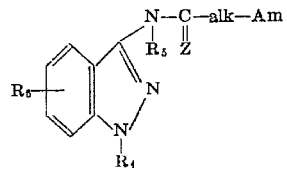

(II)

wherein $R_4$ is phenyl, (lower alkyl)-phenyl, (lower alkoxy)-phenyl, (halogeno)-phenyl or (trifluoromethyl)-phenyl, $R_5$ is hydrogen or lower alkyl, Am is mono- or di-lower alkylamino, lower alkyleneimino or monoaza-lower alkyleneimino wherein the heteroatoms are separated by at least two carbon atoms, alk is alkylene with up to four carbon atoms, Z is oxo or two hydrogen atoms and $R_6$ is hydrogen or halogeno, or therapeutically useful acid addition salts thereof.

Especially valuable are the compounds of Formula II wherein $R_4$ is phenyl, 4-(fluoro or chloro)-phenyl, $R_5$ is hydrogen and Am is methylamino, ethylamino, dimethylamino, diethylamino, pyrrolidino, piperidino, piperazino, 4-methylpiperazino or 4-ethylpiperazino, alk is methylene, 1,1- or 1,2-ethylene, Z is oxo or 2 hydrogens and $R_6$ is hydrogen, or therapeutically useful acid addition salts thereof, above all the 1-(4-fluorophenyl)-3-(2-dimethylaminoethylamino)-indazole and said salts, which show anti-depressant activity, for example, at an i.p. dose of about 6 mg/kg/day in the rat's amphetamine potentiation test.

The compounds of the invention are prepared according to methods in themselves known. Advantageously they are obtained by converting in a compound of the formula

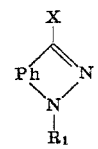

in which X is a substituent capable of being converted into

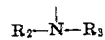

X into said amino group and, if desired, converting any resulting compound into another compound of the invention.

A substituent X capable of being converted into

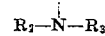

is, for example, the

group. The corresponding starting material, or an alkali metal salt thereof, is reacted with a reactive derivative of the alcohol, or advantageously the acid $R_3$—OH, preferably a halide, e.g., chloride or bromide, sulfate or sulfonate, e.g., methane, ethane, benzene or p-toluene sulfonate, or anhydride respectively.

Another substituent X is, for example, the $R_2$—N—Y group wherein Y is a substituent capable of being converted into $R_3$, e.g., (a) reactively esterified hydroxyalkyl or -alkanoyl, e.g., said halogeno- or sulfonyloxyalkyl or -alkanoyl, or (b) a (nitro, oximino, imino, cyano, carbamoyl, isocyanato or esterified carboxyamino, e.g., carbalkoxyamino)-alkyl, -alkenyl, -alkanoyl or -hydroxyalkyl group. The starting material containing the Y mentioned under item (a) is reacted with ammonia, a corresponding amine or an alkali metal salt thereof, whereas that corresponding to the Y mentioned under item (b) is reduced and/or hydrolyzed, e.g., with the use of catalytically activated or nascent hydrogen, such as hydrogen in the presence of nickel, palladium or platinum catalysts or generated during electrolysis or in the reaction of metals, e.g., sodium or zinc, with hydrogen donors, e.g., alkanols or mineral acids respectively, or the use of reducing agents, such as simple or complex, light methyl hydrides, advantageously boron hydrides r alkali metal aluminum hydrides, e.g., lithium aluminum hydride. Isocyanates and urethanes may also be subjected to hydrolysis, e.g., with the use of aqueous mineral acids or alkalies.

The compounds of the invention so obtained may be converted into each other according to known methods. For example, resulting compounds containing a primary or secondary amino groups, may be reacted with a reactive ester of a corresponding alcohol, e.g., alkanol or alkanediol, or may be acylated, for example, with a reactive functional derivative of a corresponding acid, such as a halide or anhydride thereof, or resulting acyl derivatives may be hydrolyzed, for example, with the use of acidic or alkaline hydrolyzing agents, or advantageously reduced, e.g., with said simple or complex light metal hydrides. Resulting tertiary amines may be quaternized in the usual manner, for example with the use of reactive esters of alcohols, preferably of lower alkanols, but also of HPh-alkanols, and said hydrohalic, sulfuric or sulfonic acids.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, e.g., hydrochloric, hydrobromic, sulfuric, phosphoric, nitric or perchloric acid; aliphatic or aromatic carboxylic or sulfonic acids, e.g., formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicyclic, embonic, nicotinic, methanesulfonic, ethanesulfonic, hydroxyethanesulfonic, ethylenesulfonic, benzenesulfonic, p-toluenesulfonic, halogenbenzenesulfonic, sulfanilic and cyclohexylsulfamic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g., sodium or potassium salts. Mainly, those starting materials should be used in the process of the invention that lead to the formation of those compounds indicated above as being specially valuable.

The starting material used is known (U.S. Pat. No. 3,133,081) or, if new, may be prepared according to known methods. For example, that in which X is primary amino, can be obtained by reacting a H—Ph-glyoxylic acid derivative, e.g., an ester or the nitrile thereof, with an $R_1$-hydrazine, and ring-closing the hydrazone obtained with the aid of lead tetraacetate and boron trifluoride. Any resulting 1-$R_1$-indazole-3-carboxylic acid derivative, e.g., the ester or nitrile, is then hydrolyzed to the free acid with aqueous alkalies or acids respectively, e.g., sodium hydroxide or sulfuric acid. Said 3-acid is then subjected to Curtius degradation, i.e., converted into its halide with the use of thionyl or phosphorus halides, e.g., thionyl chloride or phosphorus oxychloride, the halide reacted with sodium azide, the resulting azide rearranged into the isocyanate or urethane by heating it in the presence or absence of an alcohol, e.g., lower alkanol, and hydrolyzing them to the 3-amines with the use of aqueous alkalies, e.g., potassium hydroxide. Said amine can then be reacted with a lower alkanoic acid or free or etherified hydroxy-alkanoic acid, and the amide formed reduced with said light metal hydrides, to yield the compounds in which X is

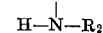

These can further be reacted either with reactive derivatives of the alcohol or acid Y—OH (analogous to those of the formula $R_3$—OH) or with ethylene oxide. Any resulting 3-hydroxyalkylamino or -alkanoylamino compound can be reactively esterified, e.g., with thionyl or sulfonyl halides, or oxidized to the corresponding aldehydes, ketones or acids, for example, with hydrogen peroxide, alkali metal chromates or permanganates, mercuric, manganese or silver oxide in acidic or alkaline media. Resulting haloalkyl compounds can be reacted with silver nitrite or alkali metal cyanides, or resulting acids converted into the corresponding amides or azides as shown above, or the aldehydes or ketones reacted with ammonia, amines or hydroxylamine, in order to obtain the nitro compound or nitrile, the Schiff's base, oxime, isocyanate or urethane starting material.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g., lactose, glucose or sucrose, starches, e.g., corn starch or arrowroot, stearic acid or salts thereof, e.g., magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75 percent, more particularly 1 to 50 percent, of the active ingredient. They are also included within the scope of the present invention.

The following examples are intended to illustrate the invention and are not to be construed as being limitations thereon. Temperatures are given in degrees Centigrade, and all parts wherever given are parts by weight.

EXAMPLE 1

Through the solution of 6.0 g 1-(4-fluorophenyl)-3-bromoacetylamino-indazole in 250 ml tetrahydrofuran, a slow stream of dimethylamine is passed while stirring, until saturation has been reached. The mixture is stirred for 16 hours at room temperature, filtered and the filtrate evaporated in vacuo. The residue is taken up in methylene chloride, the solution washed with aqueous sodium bicarbonate, dried, filtered and evaporated, to yield the 1-(4-fluorophenyl)-3-dimethylaminoacetylamino-indazole of the formula

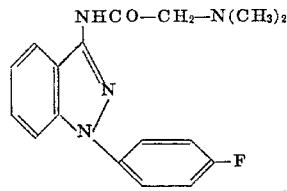

melting at 110°–111°.

It is taken up in the minimum amount of ethanol and the solution neutralized with ethereal hydrogen chloride, to yield the corresponding hydrochloride melting at 173°–175°.

The starting material is prepared as follows: The mixture of 45 g methyl phenylglyoxylate, 45 g 4-fluorophenylhydrazine hydrochloride, 27 g sodium acetate and 1.5 liter ethanol is refluxed for 24 hours while stirring. It is filtered hot, the filtrate cooled and the precipitate formed filtered off, to yield the methyl phenylglyoxylate 4-fluoropphenyl-hydrazone, melting at 88°–90°.

The solution of 62 g thereof in 2 liters methylene chloride is added dropwise to the solution of 112 g lead tetraacetate in 1.2 liter methylene chloride while stirring and cooling with ice. The mixture is stirred for 2 hours at room temperature, whereupon 1 liter water is added while stirring. The mixture is filtered with the aid of infusorial earth, the filtrate washed with water and aqueous sodium bicarbonate, dried and concentrated to about 800 ml. To the concentrate, 280 ml borontrifluoride-etherate are added, and the mixture refluxed for 5-½ hours. After cooling, water is added dropwise, the organic layer separated, washed with aqueous sodium bicarbonate, dried and evaporated. The residue is recrystallized from ethanol, to yield the 1-(4-fluorophenyl)-indazole-3-carboxylic acid methyl ester melting at 127°–129°.

The mixture of 51.5 g thereof, 350 ml ethanol, 350 ml water and 190 ml N aqueous sodium hydroxide is stirred at 80° for 3 hours and stirred overnight at room temperature. It is concentrated in vacuo, the concentrate acidified with 195 ml N hydrochloric acid and 1 liter water is added. The precipitate formed is filtered off and dried in vacuo, to yield the corresponding acid melting at 189°–191°.

The mixture of 10.2 g thereof and 50 ml thionyl chloride is refluxed for 1-½ hours and evaporated in vacuo. The residue is taken up in 350 ml acetone and the solution of 17.5 g sodium azide in 70 ml water is added while stirring vigorously. Stirring is continued for 2 hours at room temperature, and the mixture poured onto 250 ml ice and water. The precipitate formed is filtered off and dried in vacuo overnight at room temperature, to yield the 1-(4-fluorophenyl)-indazole-3-carboxylic acid azide.

The suspension of 10.9 g thereof in 300 ml ethanol is refluxed overnight while stirring under nitrogen, during which time it becomes homogeneous. It is concentrated in vacuo to about 100 ml and the concentrate cooled in an ice bath. The precipitate formed is filtered off, to yield the 1-(4-fluorophenyl)-3-carbethoxyamino-indazole melting at 120°–122°.

To the solution of 6.0 g thereof in 50 ml hot ethanol, 50 ml 30 percent aqueous potassium hydroxide are added and the whole is refluxed for 16 hours. It is concentrated in vacuo, the concentrate extracted with methylene chloride, the extract dried, filtered, evaporated and the residue recrystallized from diethyl ether, to yield the 1-(4-fluorophenyl)-3-aminoindazole melting at 129°–131°.

To the mixture of 8.2 g thereof, 250 ml methylene chloride and 4.5 g anhydrous sodium bicarbonate, 4.5 ml bromoacetyl bromide are added while stirring, and stirring is continued for 17 hours. It is thoroughly washed with water, dried, filtered and evaporated, to yield the 1-(4 -fluorophenyl)-3-bromoacetylaminoindazole melting at 191°–193°.

EXAMPLE 2

The solution of 5.4 g 1-(4-fluorophenyl)-3-dimethylamino acetylamino-indazole in 35 ml tetrahydrofuran is added dropwise to 37 of a 1 molar solution of borane in tetrahydrofuran while stirring at 0° under nitrogen, and stirring is continued for 20 minutes at this temperature. Hereupon the mixture is refluxed for 2 hours, cooled and carefully combined with 23 ml 5N hydrochloric acid. It is concentrated under normal pressure, the concentrate made basic with saturated aqueous sodium carbonate and extracted with methylene chloride. The extract is dried, filtered and evaporated in vacuo, 5.4 g of the residue are taken up in 35 ml acetone, one equivalent of ethereal hydrogen chloride is added and the precipitate formed filtered off, to yield the 1-(4-fluorophenyl)-3-(2-dimethylaminoethylamino)-indazole hydrochloride of the formula

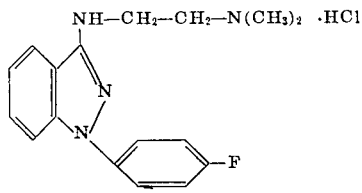

melting at 125°–127°.

EXAMPLE 3

To the solution of 6.0 g piperazine in 500 ml tetrahydrofuran, 5.1 g 1-(4-chlorophenyl)-3-bromoacetylamino-indazole are added portionwise while stirring, and stirring is continued for 16 hours at room temperature. The mixture is evaporated in vacuo, the residue taken up in methylene chloride, the solution washed with aqueous sodium bicarbonate, dried, filtered and evaporated. The residue is taken up in the minimum amount of ethanol, the solution neutralized with ethereal hydrogen chloride and the precipitate formed filtered off, to yield the 1-(4-chlorophenyl)-3-piperazinoacetylamino-indazole dihydrochloride of the formula

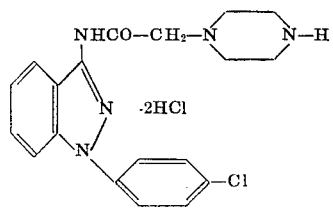

melting at 253°–255°.

EXAMPLE 4

In the exactly analogous manner shown in the previous examples, one obtains the following compounds of Formula II, $R_{5,6}$ H from equivalent amounts of the corresponding starting material:

| $R_4$ | Z | alk | Am | Salt | m.p. |
|---|---|---|---|---|---|
| phenyl | O | $CH_2$ | piperidino | — | 80–82° |
| " | $H_2$ | " | " | HCl | 189–191° |
| " | " | " | $N(CH_3)_2$ | " | >100° decomp. |
| 4-fluoro-phenyl | O | $1,2-C_2H_4$ | " | " | 191–193° |
| " | $H_2$ | $CH_2$ | $NH_2$ | " | 231–233° |
| " | " | $1,2-C_2H_4$ | $N(CH_3)_2$ | " | 166–168° |
| " | " | " | piperidino | " | 200–202° |
| " | " | $CH_2$ | " | maleate | >55° decomp. |
| " | " | " | $N(C_2H_5)_2$ | HCl | 178–180° |
| 4-chloro-phenyl | O | " | $N(CH_3)_2$ | — | 127–129° |
| " | O | " | piperidino | — | 134–136° |
| " | O | $1,1-C_2H_4$ | $N(CH_3)_2$ | — | 109–111° |
| " | $H_2$ | $CH_2$ | $NHCH_3$ | HCl | 175–177° |
| " | " | " | $N(CH_3)_2$ | " | 176–178° |
| " | " | " | $N(C_2H_5)_2$ | " | 179–181° |
| " | " | " | piperidino | " | 224–226° |

The corresponding 1-$R_4$-3-amino-indazoles have the following characteristics:
$R_4$ = phenyl m.p. 85°–87°
$R_4$ = 4-chlorophenyl m.p. 139°–141°.

EXAMPLE 5

Preparation of 10,000 tablets each containing 50.0 mg of the active ingredient:

Formula:
| | |
|---|---|
| 1-(4-fluorophenyl)-3-(2-dimethylamino-ethylamino)-indazole hydrochloride | 500.00 g |
| Lactose | 1,706.00 g |
| Corn starch | 90.00 g |
| Polyethylene glycol 6,000 | 90.00 g |
| Talcum powder | 90.00 g |
| Magnesium stearate | 24.00 g |
| Purified water | q.s. |

PROCEDURE

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

In the analogous manner tablets are prepared, comprising another compound of the previous examples, e.g., the 1-(4-chlorophenyl)-3-piperazinoacetylamino-indazole dihydrochloride, as the active ingredient.

I claim:
1. A compound having the formula

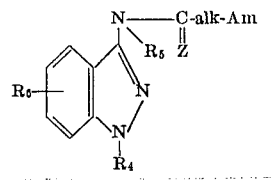

wherein $R_4$ is phenyl, (lower alkyl)-phenyl, (lower alkoxy)-phenyl, (halogeno)-phenyl or (trifluoromethyl)-phenyl, $R_5$ is hydrogen or lower alkyl, Am is mono- or di-lower alkylamino, 5 to 7 ring-membered lower alkylene imino, piperazino, 4-methyl or ethyl-piperazino, alk is lower alkylene, in which groups "lower" defines such with up to four carbon atoms, Z is oxo or two hydrogen atoms and $R_6$ is hydrogen or halogeno, or therapeutically useful acid addition salts thereof.

2. A compound as claimed in claim 1, in which formula $R_4$ is phenyl, 4-(fluoro or chloro)-phenyl, $R_5$ is hydrogen and Am is methylamino, ethylamino, dimethylamino, diethylamino, pyrrolidino, piperidino, piperazino, 4-methylpiperazino or 4-ethylpiperazino, alk is methylene, 1,1- or 1,2-ethylene, Z is oxo or 2 hydrogens and $R_6$ is hydrogen, or therapeutically useful acid addition salts thereof.

3. A compound as claimed in claim 1 and being the 1-(4-fluorophenyl)-3-(2-dimethylaminoethylamino)-indazole or therapeutically useful acid addition salts thereof.

4. A compound as claimed in claim 1 and being the 1-(4-chlorophenyl)-3-piperazinoacetylamino-indazole or therapeutically useful acid addition salts thereof.

* * * * *